July 3, 1928.
D. F. FESLER
LUBRICANT COMPRESSOR
Filed Jan. 10, 1924
1,675,452
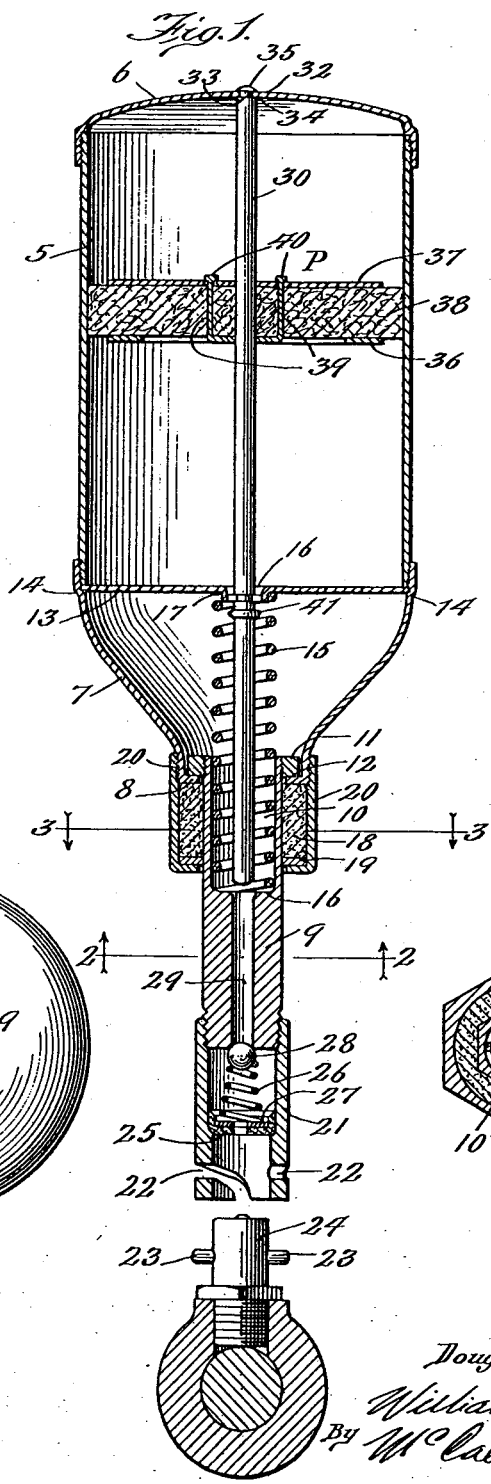

Patented July 3, 1928.

1,675,452

UNITED STATES PATENT OFFICE.

DOUGLAS F. FESLER, OF CHICAGO, ILLINOIS, ASSIGNOR TO THE BASSICK MANUFACTURING COMPANY, OF CHICAGO, ILLINOIS, A CORPORATION OF DELAWARE.

LUBRICANT COMPRESSOR.

Application filed January 10, 1924. Serial No. 685,357.

My invention relates to improvements in lubricant compressors and is particularly concerned with the provision of a novel compressor adapted to form a part of a lubricating system, comprising a plurality of fittings which are adapted to be secured to the various bearings to be lubricated, and a compressor comprising means for successively making sealed connections with the several fittings, the compressor also including means for placing the lubricant therein under pressure.

The objects of my invention are:

First, to provide a compressor comprising a barrel or reservoir for holding a supply of lubricant, and means whereby a sealed connection with a fitting can be easily effected, and whereby the lubricant can be discharged from the compressor under comparatively high pressures;

Second, to provide a lubricant compressor of the character described, so constructed that the acts of establishing a sealed connection with a fitting and placing the lubricant under pressure can be effected by means of one hand;

Third, to provide a compressor of the character described, embodying or comprising a plunger rod which also acts as a guide for a follower in the barrel of the compressor;

Fourth, to provide a compressor such as described, which is simple in construction, economical to manufacture and easy to operate.

Other objects of my invention will appear as this description progresses, reference being had to the accompanying drawings, in which—

Figure 1 is a central longitudinal section through a compressor embodying my invention. This view also shows in side elevation one of the fittings which may be used with a compressor of my improved construction;

Figure 2 is a transverse section taken on line 2—2 of Figure 1; and

Figure 3 is a similar section taken on line 3—3 of Figure 1.

Throughout the several views similar reference characters will be used for referring to similar parts.

Referring to the drawings, my improved compressor comprises a barrel or reservoir 5 which is provided at one end with the removable cap 6, and at the other end with the cap 7, the outer end of which is open and provided with an inturned flange 8 having in the embodiment of my invention disclosed herein a hexagonal shaped opening. Slidably mounted in this opening is the cylinder 9 which is counter-bored a portion of its length as shown at 10. A nut 11 secured to the inner end of the cylinder prevents the latter from being withdrawn through the opening in the flange 8. I prefer to insert a gasket 12 of felt or fibre between the nut 11 and the flange 8.

A diaphragm or partition 13 is clamped between the shoulder 14 on the cap 7 and the adjacent end of the barrel 5 as an abutment for the inner end of the compression spring 15, the outer end of this spring being in engagement with the shoulder 16 of the cylinder 9 formed by the counter-bore 10.

The diaphragm 13 is provided with a central aperture 16 which is flanged as shown at 17 to provide a boss for centering the inner end of the spring 15.

To prevent leakage between the barrel portion of the compressor and the cylinder 9, I provide the gasket 18 which is preferably of felt, the follower 19, and the gland 20, which screws onto the screw threaded end of the cap 7 as shown at 20.

The outer end of the cylinder 9 is provided with a coupling member 21 in the form of a sleeve which, in the embodiment of my invention disclosed herein, is provided with two oppositely disposed bayonet slots 22 for receiving the ends 23 of the pin forming a part of the fitting 24. This fitting is of well known construction, and for that reason further description thereof is unnecessary. A cup leather 25 is slidably mounted in the sleeve 21 and is yieldingly held in its outermost position by means of the compression spring 26, the outer end of which bears against a washer 27 in the bottom of the cup leather. The inner end of the spring 26 yieldingly holds the ball closure 28 upon its seat which is formed by the outer end of the bore 29 of the cylinder 9.

The outer end of the plunger rod 30 is reduced in diameter as shown at 32 to provide a shoulder 33 for engaging the cap 6. The reduced portion of the plunger rod extends loosely through an opening 34 in the cap 6 and is riveted over as shown at 35 to prevent it from being withdrawn from the opening. The inner end of the plunger 30 extends to a position adjacent the inner end of the bore 29 of the cylinder 9 when the cylinder 9 is in its outermost position.

A piston or follower P comprising the face plate 36, the follower plate 37, and the felt disc 38, confined between the two plates, is slidably mounted upon the plunger rod 30. Two or more tongues 39 are stamped from the face plate 36 and extend through the felt disc 38 and suitable openings in the follower plate 37. The free ends of the tongues 39 are riveted as shown at 40 to secure the two plates and the felt disc 38 together.

The plunger rod 30 is beaded as indicated at 41 to provide projections which will pass through the opening 16 but will engage the face plate 36 when the cap 6 is removed from the barrel, so as to enable the operator easily to withdraw the piston P from the barrel to enable the barrel to be refilled.

In the operation of my improved compressor, the barrel 5 is first filled with lubricant leaving the piston P at the outer end thereof, that is, adjacent the cap 6. The operator then grasps the barrel in his hand and brings the coupling member 21 thereof into the position shown in Figure 1 relative to a fitting 24 and then engages the sleeve 21 over the end of the fitting. By rotating the barrel 5 in the proper direction, the slots 22 are caused to receive the ends 23 of the pin forming a part of the fitting, thereby drawing the sleeve 21 downwardly over the fitting until the end of the latter is brought into sealing relation with the cup leather 25. The operator thereupon pushes upon the end cap 6 of the compressor, causing the latter to move toward the coupling, whereupon the end of the plunger rod 30 enters the bore 29, and continued movement of the barrel 5 causes the plunger rod 30 to expel the contents of the cylinder 9 past the check valve 28, through the cup leather 25, and into the fitting. When pressure upon the cap 6 is released, the spring 15 returns the parts of the compressor to the relative positions shown in Figure 1. Upon the initial return movement, the valve 28 closes, and the continued retraction of the plunger 30 causes a vacuum to be produced in the bore 29, and when the end of the plunger 30 clears the inner end of the bore 29, this vacuum permits the atmospheric pressure acting upon the rear side of the plunger P to push the latter forward and thereby fill the bore 29 with a new charge of lubricant. By repeatedly reciprocating the barrel 5 with respect to the cylinder 9, the operator can force as much lubricant under pressure into the fitting 24 as he may desire. When this has been accomplished by rotating the barrel in the direction opposite to which it was initially rotated, the operator can release the coupling member or sleeve 21 from the fitting and proceed to the next bearing where the above operations may be repeated.

While I have described the details of construction of the preferred embodiment of my invention, it is to be clearly understood that my invention is not limited to these details, but is capable of other adaptations and modifications within the scope of the appended claims, and it is to be distinctly understood that wherever the word "coupling member" is used throughout this specification and claims hereof, and wherever reference is made to means for effecting a sealed connection between the compressor and the fitting, the construction referred to does not necessarily include means such as described for effecting a positive mechanical connection between the fitting and the compressor, but relate only to means for establishing a sealed connection between these two elements. It will, of course, be seen that my improved compressor will operate in the same manner if the ends 23 of the pin are omitted from the fitting and the slots 22 are omitted from the coupling member.

Having thus described my invention, what I claim is:—

1. A lubricant compressor comprising a barrel having a cap at one end and an opening at the other end, a cylinder reciprocably mounted in said opening, a coupling member secured to the outer end of said cylinder, a spring for urging said cylinder outwardly, a valve for closing the outer end of said cylinder, a plunger supported by said cap and extending inwardly to a point adjacent the inlet end of said cylinder when said cylinder is in its outermost position, and a follower slidably mounted on said plunger rod.

2. A lubricant compressor comprising a barrel having an opening at one end, a cylinder reciprocably mounted in said opening, a coupling member secured to the outer end of said cylinder, a spring for urging said cylinder outwardly, a plunger rod supported in said barrel in alignment with the bore of said cylinder, and a follower slidably mounted on said plunger rod and movable toward said coupling to discharge the contents of said barrel into said cylinder.

3. A lubricant compressor comprising a barrel having a polygonal shaped opening at one end, a cylinder slidably mounted in said opening, the said cylinder having a polygonal cross section similar to the shape of said opening, a stationary packing fitting said polygonal cylinder to prevent leakage of the contents of said barrel, a plunger rod for said cylinder, and a coupling member carried by the outer end of said cylinder, said coupling member comprising means for making a detachable connection with a fitting upon rotation of said coupling member relatively to said fitting.

4. A lubricant compressor comprising a barrel having a cap at one end and an opening at the other end, a cylinder reciprocably mounted in said opening, a coupling member secured to the outer end of said cylinder, a spring for urging said cylinder outwardly, a valve for closing the outer end of said cylinder, a plunger supported by said cap and extending inwardly to a point adjacent the inlet end of said cylinder when said cylinder is in its outermost position, a follower slidably mounted on said plunger rod, and means for limiting sliding movement of said follower on said rod whereby said follower may be withdrawn with said rod to permit filling of said barrel.

5. A lubricant compressor comprising a barrel having a cap at one end and an opening at the other end, a member reciprocable through the opening in said barrel, said member having a cylinder therein normally in communication with said barrel, a plunger rod connected to said cap and slidable into said cylinder, a piston in said barrel cooperable with the walls thereof and slidable on said rod.

In witness whereof, I hereunto subscribe my name this 31st day of December, 1923.

DOUGLAS F. FESLER.